March 13, 1956 S. METZGER 2,738,463

PULSE CODE EXPANDER

Filed Feb. 1, 1952 2 Sheets-Sheet 1

INVENTOR
SIDNEY METZGER
BY Percy P. Lantzy
ATTORNEY

March 13, 1956 S. METZGER 2,738,463

PULSE CODE EXPANDER

Filed Feb. 1, 1952 2 Sheets-Sheet 2

INVENTOR
SIDNEY METZGER
BY [signature]
ATTORNEY

United States Patent Office 2,738,463

Patented Mar. 13, 1956

2,738,463

PULSE CODE EXPANDER

Sidney Metzger, Bergenfield, N. J., assignor to International Telephone and Telegraph Corporation, a corporation of Maryland Application February 1, 1952, Serial No. 269,561

16 Claims. (Cl. 332—1)

This invention relates to pulse code communication systems and more particularly to a pulse code expander for such systems.

For improvement of the signal-to-noise ratio in signal communication, it is desirable to amplify the signals according to an expansion curve simulating a logarithmic or exponential function. One of the objects of this invention, therefore, is to provide an expander circuit for decoded signals in an exponential proportion, that is, the amount of expansion being dependent, according to an exponential function, upon the amplitude of the decoded signal.

Another object is to provide a decoder system for decoding pulse code modulated signals to amplitude modulated pulses and to expand the amplitude modulated pulses according to a characteristic of the coded signals.

Still another object is to provide an expander circuit having amplifier means of constant gain characteristic as contrasted to non-linear amplifiers. In accordance with a feature of the present invention, there is provided a plurality of amplifiers of constant but successively greater gain. The coded signals received are first decoded, and the resulting amplitude modulated pulse of each code signal is fed simultaneously to all of the amplifiers. The amplifiers, however, are gate controlled by a characteristic of the code signals so that each amplitude modulated signal is expanded by one of the amplifiers according to the code signal. Where the coded signals are based upon a code such as the binary and cyclic permutation codes, this gate control can be arranged to provide an exponential signal expansion.

The above-mentioned and other features and objects of this invention will be best understood by reference to the following description of embodiments of the invention taken in conjunction with the accompanying drawings, wherein:

Fig. 1 is a block diagram illustrating an expander for use with the standard binary code;

Fig. 1*a* is a graph of pulse curves used in explaining the operation of the system of Fig. 1;

In conventional code modulation transmission systems the signal, which may be, for example, an audio or video signal, may first be compressed and then quantized into a number of discrete amplitude levels, the instantaneous value of the compressed and quantized signal being indicated by transmitting a corresponding code signal. The code is usually transmitted by means of pulses, either present or absent in a given set of digital code positions.

Figure 2:
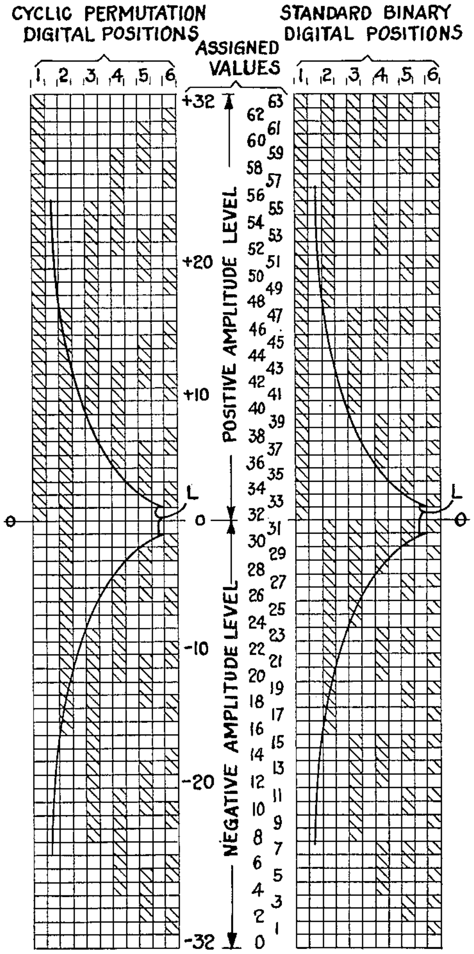
Fig. 2 is a chart illustrating the standard binary code and the binary "cyclic permutation" code.

Referring first to Fig. 2, two binary codes are illustrated, one being the standard binary code and the other being known as the binary "cyclic permutation" code. In these code charts the presence of a pulse is indicated by cross-hatching and the absence of a pulse by the absence of cross-hatching. The codes illustrated are 6 element codes, that is, for each value to be indicated a group of six digital positions is provided in each of which positions a pulse may or may not appear.

Both of these six element codes represent 64 progressive code values designated as 0 to 63. These 64 code values may be used to indicate 32 "negative" and 32 "positive" amplitude levels. The 0 assigned value of the code may express the maximum negative excursion (−32 units) while the 63 assigned value represents the maximum positive excursion (+32 units) of the signal. The zero or mean amplitude level of the signal is represented by a point between the 31 and 32 assigned value as indicated by the zero axis line 0—0. Thus code values from 32 to 63 represent respectively progressively greater positive amplitude levels, while code values from 31 to 0 represent respectively progressively greater negative amplitude levels.

In constructing these codes, different weights are given to each digital position in the presence of a pulse and no weight in the absence of a pulse. In some codes, this is reversed, the presence of a pulse having no weight, its absence signifying the weight of its digital position. However, it will be appreciated that the two codes are essentially equivalent, and readily interchangeable by phase inversion.

In both codes described hereinafter the pulses are usually transmitted in the order of their digital positions, the first transmitted pulse being that in digital position 1, the second transmitted pulse being in digital position 2, etc. The weights assigned to the pulses usually increase in the reverse order of their digital positions, which may be termed the "denominational order."

The following table indicates the weight of a pulse in the standard binary code with relationship to its digital position and denominational order:

*Table*

| Denominational Order | Digital Position | Weight |
|---|---|---|
| 1 | 6 | 1 |
| 2 | 5 | 2 |
| 3 | 4 | 4 |
| 4 | 3 | 8 |
| 5 | 2 | 16 |
| 6 | 1 | 32 |

In order to properly expand a signal, the lower amplitude levels thereof are amplified least while the higher amplitude levels thereof are amplified most, and this applies both to the positive and negative polarities of the signal. Thus, referring to the standard binary code and to the code values shown on the chart, Fig. 2, signals whose code values are around 32 through 35 and 31 through 28 would be amplified least whereas signals whose assigned code values would be 48 to 63, or 15 to 0, would be amplified the most, there being an exponential increase of amplification for the values in between the lower amplitude levels and the higher amplitude levels similarly as indicated by curves L, Fig. 2.

As hereinbefore stated, a characteristic of the code is employed according to this invention to control the expansion. This characteristic will be first pointed out in connection with the portions of the standard binary code corresponding to the positive amplitude levels (values 32–63). The characteristic of interest is the digital position of the first pulse to appear after the first digital position. For example, for value 33 the first pulse to appear after the first digital position is in digital position 6; for values 34 and 35 the corresponding first pulse after the first digital position is in digital position 5; for values 36 through 39 the first pulse after the first digital position is in digital position 4; for values 40 through 47 the first pulse after the first digital position is in digital position 3; and for values 48 through 63 the first pulse after the first digital position is in the second digital position. Thus, the first pulse after the first digital position moves forward in its digital position as the amplitude of the signal is increased. This first pulse is used to control the expansion of the signal, for example by directing the decoded signal to amplifying means of corresponding gain, the gain being least if said first pulse occurs in the last digital position and being exponentially greater as the digital position in which said first pulse appears is earlier.

To produce expansion of the positive amplitude levels (32–63 code values), use is made of the code characteristic consisting of the digital position in which the first pulse after the first digital position appears. With respect to portions of the standard binary code representing negative amplitude levels (31–0 code values), a similar characteristic is found with respect to the appearance of the first blank or space representing the absence of a pulse which occurs after the first digital position. If the standard binary code is inverted for negative amplitude levels, the code for negative amplitude levels will match the code for the corresponding positive amplitude levels. This enables the use of the same decoder for both positive and negative amplitude levels, with means being provided for inverting the polarity of the output of the decoder for negative amplitude levels.

In order to determine when negative amplitude levels are being received for the purpose of making this inversion, reference is made to the code itself. It will be seen that in the first digital position for positive amplitude levels (values 32–63) a pulse always appears in the first digital position whereas for negative amplitude levels (values 31–0) no pulse appears in the first digital position. This information, inherent in the code, is used to determine when inversion is necessary in the expander.

Figure 1:
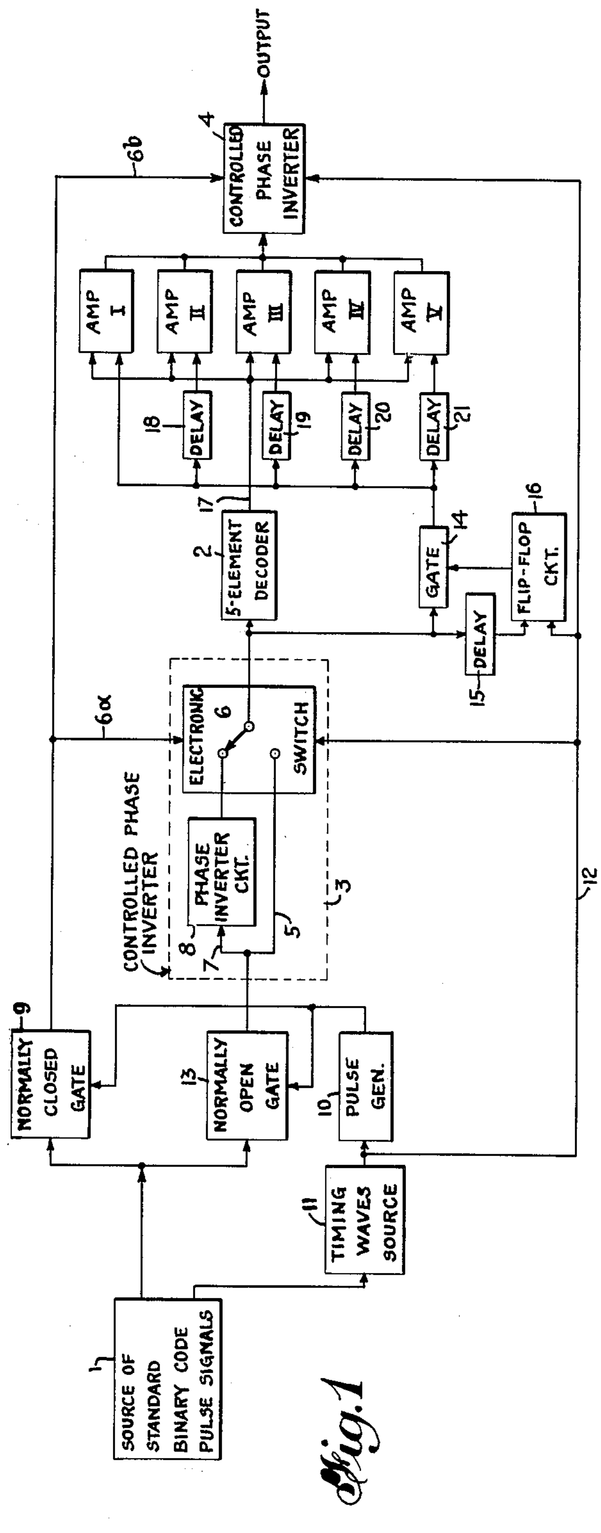

One system for making use of the foregoing information in expanding a signal transmitted by standard binary code is illustrated in Fig. 1. Signals in the form of standard binary code pulses are derived from the source 1, which may be, for example, a receiver which removes the carrier frequency from a pulse code modulated carrier wave leaving only the D. C. binary code pulses. The pulses of a code signal are decoded in a suitable decoder 2 to produce a pulse amplitude modulated in accordance with the weight of the code signal, and thereafter expanded by amplification in one of a plurality of amplifiers I–V. While the code signal from source 1 may be a code having six digital positions, such as the standard binary code of Fig. 2, the decoder need only be a five element, single ended output decoder. The first digital position is here used only to indicate the polarity of the signal. Inversion of the negative amplitude levels to corresponding positive amplitude levels is performed (for digital positions 2–6) in a controlled phase inverter 3. The decoder 2 in turn emits an amplitude modulated pulse corresponding to the code value of the input signal. This amplitude modulated pulse has the same polarity for both positive and negative amplitude levels, and therefore has to be inverted where the code signal expresses a negative amplitude level. This inversion is performed in a second controlled phase inverter 4 which is at the common output of amplifiers I–V.

The controlled phase inverters 3 and 4 are preferably identical, the inverter 3 being shown in more detail as comprising an electron switch 6 and a known phase inverter 8. In inverter 3 the input is fed either directly through a line 5 to one pole of the single pole double throw electron switch 6 or via another line 7 through phase inverter circuit 8 to the other pole of switch 6. The phase inverter circuit 8 is preferably of the type adapted to clamp the output thereof with respect to a zero level.

The phase inverters 3 and 4 are controlled in the following manner. When there is a pulse in the first digital position, the signal level indicated is positive and no inversion is to take place in the inverters. The electronic switch 6 is connected via line 5 directly to the input without an intervening phase inverter circuit. On the other hand if no pulse appears in the first digital position the electronic switch 6 is moved by energy passed over connection 6a to the position where the signal feeds through the phase inverter circuit 8 and is thereby inverted.

To separate pulses in the first digital position from those in other digital positions, the source 1 is connected to a normally closed gate 9 which is periodically opened at times corresponding to the first digital position by pulses derived from a pulse generator 10 whose timing is in turn controlled by a timing wave source 11 connected likewise to source 1. The timing wave source 11 may be controlled by the incoming code signals in any one of several different manners well known in the art. If a pulse is found in the first digital position, this pulse is passed through the gate and is applied over connections 6a and 6b to the electronic switches of inverters 3 and 4 to move the switch in each so that the input thereto is connected directly with line 5; and no inversion of the energy passing therethrough occurs. At the beginning of each group of pulses, a short pulse, as will be indicated in the description with respect to Fig. 1A, derived from the timing source 11, is fed via a line 12 to each of the electronic switches of inverters 3 and 4 and resets them so that they are connected to the line 7 for inversion of the following pulse group in the absence of a positive pulse in the first digital position. The code signals from source 1 are fed via a normally open gate 13 to the controlled phase inverter 3. This gate is closed during the time of the first digital position by a pulse from pulse generator 10, which pulse is also applied to open the normally closed gate 9.

Figure 1A:
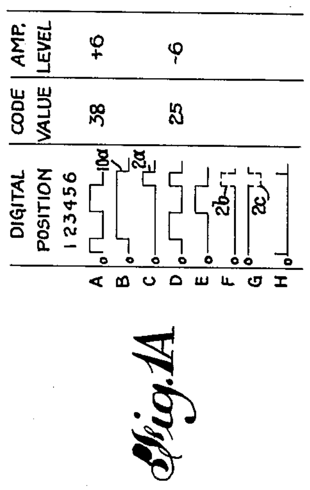

The foregoing will be clearer from an examination of Fig. 1A, in which a curve A indicates a positive code signal having amplitude level +6, and a code value 38. It will be seen that pulses appear in the first, fourth, and fifth digital positions. The pulse in the first digital position is separated in normally closed gate 9 and is applied to the electronic switch 6 so that no inversion occurs either in inverter 3 or 4. The normally open gate 13 blocks the pulse in the first digital position from passing through, but opens up in time to allow pulses in the second through the sixth digital position to pass, as indicated in curve B. The signal of curve A which coincides with positive portion 10a, curve B, passes along line 5 through the electronic switch 6 to the five element decoder which produces an amplitude modulated pulse 2a, curve C, at its output at a time coinciding with digital position 6. This pulse is next expanded in one of the amplifiers I–V and passes through circuit 5 of inverter 4 without being inverted.

In the case of a negative signal the system operates as follows: for example, curve D illustrates a negative code signal of amplitude level −6 and code value 25. No pulse appears in the first digital position. Therefore, the electronic switches 6 of inverters 3 and 4 will both be connected to the phase inverter circuit 8 thereof whereby the pulses passing therethrough are inverted, as indicated in curve E, no pulse being shown in the first digital position because this first digital position is blocked in the normally open gate 13. The five element decoder then decodes the signal of curve E as if it were a positive signal, just as the corresponding positive level of curve B was decoded. However, after an amplitude modulated pulse 2b, curve F, is obtained, it is fed through the selected ones of the amplifiers I–V and inverted in inverter 4. It is to be noted that inverter 4 changes a positive pulse 2*b*, as shown in curve F, to a negative pulse 2*c*, as shown in curve G. To ensure this, a suitable zero clamping circuit may be provided. This inversion, of course, is different from that produced in phase inverter 3 where a positive pulse becomes a blank and a blank becomes a positive pulse. Here again the adjustment of the clamping circuit determines the zero level (see curves D and E to indicate the clamping level). Curve H indicates the resetting pulses for inverters 3 and which are obtained over line 12, and it will be seen that these pulses coincide with the beginning of each group of pulses.

The amplitude modulated pulses at the output of decoder 2 are expanded in accordance with the characteristic of the code, the characteristic being the appearance of the first pulse after the first digital position in both positive and negative amplitude levels with the proviso that the negative code signals be inverted. At the output of inverter 3 only pulses in the five digital positions following the first digital position will appear and the negative amplitude levels will be inverted. Thus the first pulse that will appear at the output of inverter 3 will be the pulse which is used to control the selection of the amplifier having the desired gain. This first pulse may be selected by feeding it directly to a gate 14 and via a delay device 15 whose delay is equal to the period occupied by some fraction of a pulse (for example a half), to a flip-flop circuit 16. This flip-flop circuit 16 in turn responds to the delayed pulse to close the controlled gate 14 after the first pulse or a substantial portion thereof has passed therethrough. The flip-flop circuit is flipped back by a reset pulse from line 12 at the beginning of each pulse group so as to open the gate 14. The first pulse after the first digital position thus passes through gate 14 which thereafter closes to the remaining pulses of the code signal. The pulse which passes gate 14 is used to select the particular amplifier and will be referred to hereinafter as the gating pulse, since it gates the various amplifiers successively in a distributing arrangement as is next described.

The signal from decoder 2 is applied in parallel via line 17 to each of the amplifiers I–V. The gating pulse from gate 14 is applied to the amplifiers successively after a delay between each amplifier equivalent to the time occupied by a single digital position. Thus the gating pulse is applied directly to amplifier I and then after passing through a delay network 18 to amplifier II, the delay device 18 introducing a delay equivalent to the period of one digital position. The gating pulse is next applied via a delay device 19 to amplifier III, after a delay equal to two digital positions. Likewise, a pulse through delay devices 20 and 21 result in delays of three and four digital positions, respectively. The gain of the amplifiers differs logarithmically with amplifier I having the smallest gain and amplifier V having the greatest gain. Since a gating pulse in the second digital position corresponds to the maximum amplitude level, the signal of highest amplitude level from decoder 2 will pass through amplifier V and be given maximum amplification or expansion. On the other hand since a gating pulse in digital position 6 represents a signal of the lowest amplitude level, this pulse will open amplifier I at a time corresponding to digital position 6 and the amplitude modulated pulse will be amplified or expanded a minimum amount. It will be clear that the gating pulses applied to amplifiers I to V enables each amplifier in succession. However, an output is obtained only from the one amplifier that is turned on during the occurrence of the PAM pulse.

The expansion in accordance with the binary "cyclic permutation" code will be readliy understood from the foregoing description of expansion in accordance with the standard binary code. Referring to Fig. 2, a comparison will be made between the first pulse to appear after the first digital position for the positive amplitude level of both the standard binary and the cyclic permutation code. If the code signal in the second digital position were inverted (pulses replacing blanks and blanks replacing pulses), it will be observed that the first pulse to appear after the first digital position will correspond for the positive amplitude levels of both the cyclic permutation code and the standard binary code. With this inversion of the second digital position an exponential curve L can be drawn the same as for the standard binary code. This is also true for the same conversion of the negative amplitude levels. The only inversion required is the inversion of the code signals in the second digital position. Apparatus for carrying out this inversion and expansion is disclosed schematically in Fig. 3.

Figure 3:
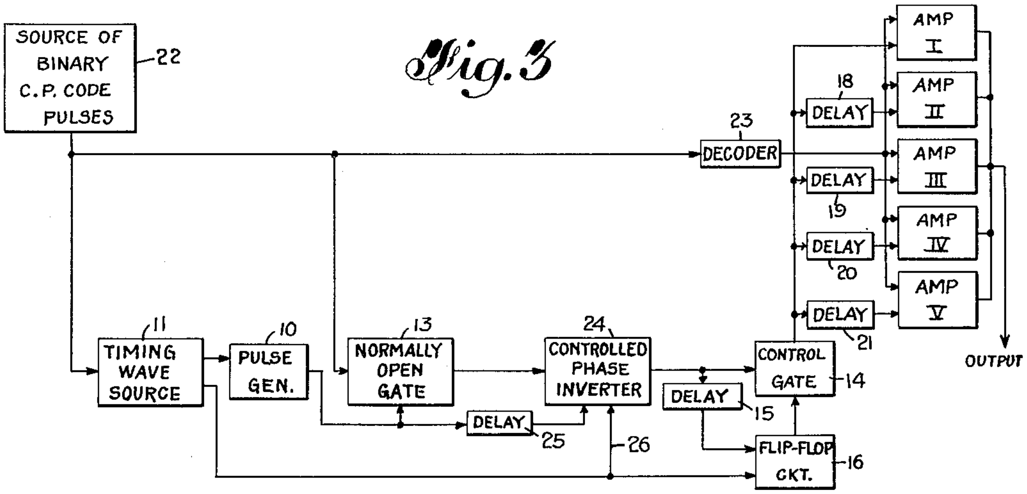
Fig. 3 is a block diagram of an expander circuit for use with the binary "cyclic permutation" code.

Referring to Fig. 3 the binary cyclic permutation pulse code signals from the source 22 are applied to a suitable six element, positive and negative output decoder 23 which produces at its output an amplitude modulated pulse at a time corresponding to the sixth digital position. This amplitude modulated pulse is expanded in an amplifier circuit such as hereinbefore described with respect to Fig. 1. This circuit includes amplifiers I to V which are normally blocked and which are opened by a distributing or gating pulse from the control gate 14, different delays being interposed at 18 to 21 so that the amplifiers become conductive successively. The output of decoder 23 is applied to the amplifiers in parallel whereas the gating pulse passing through control gate 14 is applied to each of the amplifiers in sequence. The gating pulse corresponds to the first pulse after the first digital position, except that in the cyclic permutation code all the code signals in the second digital position are inverted. To obtain this inversion the signals from source 22 are fed through the normally open gate 13 which is closed at the time of occurrence of the first digital position by a pulse from generator 10 as described in connection with Fig. 1. Thus code signals of the first digital position are not passed through gate 13, while the code signals in the subsequent digital positions are passed therethrough and applied to a controlled phase inverter 24 which may be similar in construction to inverter 3, Fig. 1. Controlled phase inverter 24 normally passes signals therethrough without inversion. However, when the second pulse code position occurs the gating pulse applied to gate 13, after a delay at 25 equivalent to the period of one digital position, is applied to the controlled phase inverter to cause it to invert code signals of the second digital position. At the end of the second digital position the phase inverter is reset by a pulse over connection 26 from the timing wave source 11 and the code signals of subsequent digital positions 3 through 6 pass through the inverter without inversion. Thus at the output of the inverter 24 the occurrence of the first pulse after the first digital position signal will correspond the same as for positive amplitude levels of the standard binary code. This first pulse then passes through control gate 14 which is closed after the said first pulse passes therethrough, so that only the first pulse will gate the amplifiers, the arrangement as indicated by delay device 15 and flip-flop circuit 16 with respect to preventing subsequent pulses from passing through being the same as that in Fig. 1. The output of the decoder is thus expanded exponentially in amplifiers I to V.

Figure 4:
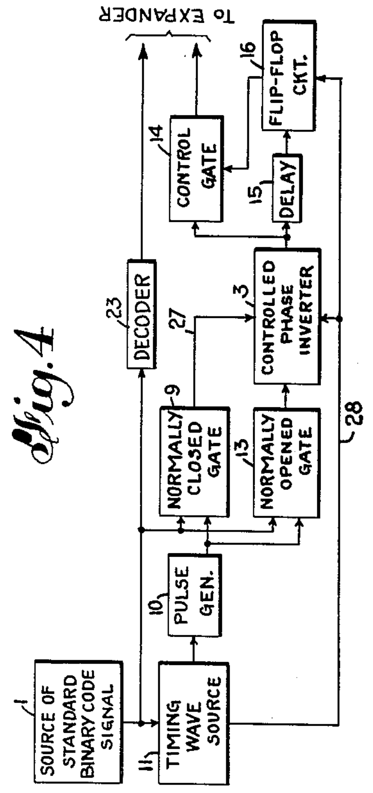
Fig. 4 is a block diagram of another expander circuit according to principles of this invention particularly adapted for use with the standard binary code.

Code signals of the standard binary code may also be used on a system similar to that shown in Fig. 3 utilizing the six element-positive-negative output decoder 23. Fig. 4 shows such a system, the blocks thereof being identified by the same reference characters as like blocks in Figs. 1 and 3. In operation, the code signals from source 1 are applied directly to decoder 23 for conversion to PAM signals, positive or negative as the case may be. A control pulse from generator 10 whose timing is controlled by wave source 11 controls operation of normally closed gate 9 and normally open gate 13, depending upon whether or not the first digital code position of a code signal has a pulse or a blank. If the signal has a pulse in the first digital position, gates 9 and 10 remain in their normal condition. If a blank appears in the first digital position, these gates are triggered during the first digital position causing a pulse to be applied over connection 27 to change the switch 6 in phase inverter 3 (see Fig. 1). This insures inversion of the negative level signals so that the first pulse to appear in the output of inverter 3, after the first digital position is in accordance with the exponential function represented by curve L, Fig. 2, will cause control gate 14 to have an output pulse of corresponding timing for successive operation of amplifiers I to V. A control wave for reset purposes is applied over connection 28 to inverter 3 and flip-flop circuit 16 as explained in connection with the embodiments shown in Figs. 1 and 3.

In the description of the three systems for carrying out the principles of my invention, certain elements have been omitted, such as pulse shapers, clamping circuits, etc., which elements are part of the basic tools of the electronic art and whose use would readily be appreciated by anyone versed in the art. Many forms of decoder for standard binary code have already been described in the literature. Refererence to U. S. Patents No. 2,570,220, issued October 9, 1951, to C. W. Earp-M. F. Wintler, may be had for disclosure of circuits for indirect decoding and direct decoding of binary code signal. The timing wave source 11 disclosed in the drawings may be included in the decoders or may be connected thereto for controlling the timing of the various operations.

While I have described above the principles of my invention in connection with specific apparatus, and a modification thereof, it is to be clearly understood that this description is made only by way of example and not as a limitation to the scope of my invention as set forth in the objects thereof and in the accompanying claims.

I claim:

1. An expander for a pulse code modulated signal comprising a decoder for decoding said code signal to produce a corresponding amplitude modulated signal, means to amplify said amplitude modulated signal and means responsive to the condition of a given digital pulse position following the first digital pulse position of the code signal applied to said decoder to control the gain of said amplifier means for amplification of said amplitude modulated signal.

2. An expander for a pulse code modulated signal according to claim 1, wherein said condition of said code signal is utilized by the means for controlling gain of said amplifier means to effect an exponential amplification.

3. An expander for a pulse code modulated signal according to claim 1, wherein the means for controlling the gain of said amplifier means includes a circuit responsive to the occurrence of the first pulse following the first digital pulse position in the code signal.

4. An expander for a pulse code modulated signal according to claim 3, wherein said circuit includes means to invert at least part of the code signal to provide the desired condition for gain control.

5. An expander for a pulse code modulated signal according to claim 4, wherein the means for inverting a part of the code signal is characterized by means operating to invert only the pulses occurring in the second digital position of the code signal.

6. An expander for a pulse code modulated signal according to claim 1, wherein the code signal represents positive and negative amplitude levels of the signal intelligence being transmitted and means are provided to invert those code signals representing the negative amplitude levels of the intelligence signal.

7. An expander for a pulse code modulated signal according to claim 6, wherein the means for inverting the code signals representing the negative amplitude levels includes means for inverting the output signals of said amplifier means, which correspond to the code pulses representing negative amplitude levels.

8. An expander for a pulse code modulated signal in which groups of pulses are transmitted, each group arranged according to a code and each representing an instantaneous amplitude value of the signal to be expanded comprising a decoder for decoding said code signals to produce an amplitude modulated pulse in response to each code group of pulses, each of said amplitude modulated pulses occurring at a predetermined time with relation to its respective pulse code group, means for amplifying said amplitude modulated pulses, means responsive to the condition of a given digital pulse position following the first digital pulse position of each code group applied to said decoder for producing a pulse whose position in time is determined by said code group and means associated with said amplifying means responsive to the time of occurrence of said pulse for determining the gain of said amplifying means for the corresponding amplitude modulated pulse.

9. An expander according to claim 8, wherein said amplifying means comprises a plurality of successive amplifiers of progressively different gains, each of said amplifiers being normally blocked, and said determining means includes a distributor arrangement for successively unblocking said amplifiers in response to the application thereto of said pulse, the output of said decoder being coupled in parallel to said amplifiers.

10. An expander for a pulse code modulated signal comprising a decoder for decoding said code signal to produce a corresponding amplitude modulated signal, a plurality of amplifiers having different gains, means for selecting one of said amplifiers for amplifying said amplitude modulated signal, and means responsive to the condition of a given digital pulse position following the first digital pulse position of the pulse code signal applied to said decoder for controlling said selecting means.

11. An expander according to claim 10, wherein said selecting means includes means for causing said amplifiers to become conductive successively at regular intervals and said controlling means includes means for determining the time at which the last mentioned means becomes effective.

12. An expander according to claim 10, wherein said selecting means includes a distributor for causing said amplifiers to become conductive successively and said controlling means includes means for producing a pulse whose position in time varies in accordance with the variation of said condition of each individual code signal, and connections for applying said pulse to said distributor to initiate operation thereof.

13. An expander according to claim 12, further including means for applying the amplitude modulated signal at the output of said decoder in parallel to said amplifiers, said amplifiers being normally non-conductive.

14. An expander according to claim 10, wherein said pulse code modulated signal is in the form of a code whose lowest assigned value corresponds to the maximum excursion in a first vectorial direction of the corresponding amplitude modulated intelligence signal, and whose highest assigned value corresponds to the maximum excursion of said intelligence signal in the opposite vectorial direction and wherein said controlling means includes means for reversing the phase of predetermined code signals, means for selecting the first pulse after the first digital position after said reversal, and means for applying the selected pulses to control said selecting means.

15. An expander according to claim 10, wherein said pulse code modulated signal is in standard binary code whose lowest assigned value corresponds to the maximum excursion in a first vectorial direction of the corresponding amplitude modulated intelligence signal and whose highest assigned value corresponds to the maximum excursion of said intelligence signal in the opposite vectorial direction, and wherein said controlling means includes means for reversing the phase of those code signals having values corresponding to one of said two vectorial directions, means for selecting the first pulse after the first digital position of the reversed phase code signals of said one direction and the unreversed phase code signals of the other direction, and means for applying the selected pulses to control said selecting means.

16. An expander for a pulse code modulated signal in which groups of pulses are transmitted, each group arranged according to the code, and representing an instantaneous amplitude value of the signal to be expanded, comprising a decoder for decoding said signals to produce an amplitude modulated pulse in response to each code group, amplifying means to amplify the output of said decoder, means responsive to each code group applied to said decoder for producing a voltage having a timing determined by the condition of a given digital pulse position following the first digital pulse position of each code group and independent of those of previous groups, and means coupled to the output of said voltage producing means for determining the gain of said amplifying means for each amplitude modulated pulse independently of that for prior amplitude modulated pulses, said determining means being responsive solely to the time characteristic of the voltage derived from the code group whose corresponding amplitude modulated pulse is being amplified, and being independent of this characteristic for prior code groups.

References Cited in the file of this patent

UNITED STATES PATENTS

| | | |
|---|---|---|
| 2,508,672 | Guanella et al. | May 23, 1950 |
| 2,537,056 | Hoeppner | Jan. 9, 1951 |
| 2,632,058 | Gray | Mar. 17, 1953 |
| 2,651,716 | Feissel | Sept. 8, 1953 |